(12) United States Patent
Yuan et al.

(10) Patent No.: US 8,337,637 B2
(45) Date of Patent: Dec. 25, 2012

(54) METHOD FOR ORDERING A DISORDERED ALLOY AND METHOD FOR MAKING A PERPENDICULAR MAGNETIC RECORDING MEDIUM

(75) Inventors: Fu-Te Yuan, Taipei (TW); An-Cheng Sun, Taipei (TW); Jen-Hwa Hsu, Taipei (TW); Ching-Ray Chang, Taipei (TW)

(73) Assignee: National Taiwan University, Taipei (TW)

( * ) Notice: Subject to any disclaimer, the term of this patent is extended or adjusted under 35 U.S.C. 154(b) by 145 days.

(21) Appl. No.: 12/632,520

(22) Filed: Dec. 7, 2009

(65) Prior Publication Data

US 2011/0061770 A1    Mar. 17, 2011

(30) Foreign Application Priority Data

Sep. 11, 2009  (TW) .............................. 98130767 A

(51) Int. Cl.
*H01F 1/04*    (2006.01)

(52) U.S. Cl. .......................... 148/121; 148/306; 148/105
(58) Field of Classification Search .................. 148/222, 148/239, 525, 565
See application file for complete search history.

(56) References Cited

U.S. PATENT DOCUMENTS

| 6,605,321 B1* | 8/2003 | Ravelosona-Ramasitera et al. ............................ 427/528 |
| 2008/0260942 A1* | 10/2008 | Maeda et al. ................. 427/131 |
| 2009/0041950 A1* | 2/2009 | Mizuno et al. ................ 427/569 |

* cited by examiner

*Primary Examiner* — John Sheehan
(74) *Attorney, Agent, or Firm* — Occhiuti Rohlicek & Tsao LLP

(57) ABSTRACT

A method for ordering a disordered alloy includes: simultaneously ion bombarding and annealing a disordered alloy to transform the disordered alloy from a disordered crystalline state to an ordered crystalline state. A method for making a perpendicular magnetic recording medium which includes an ordered alloy layer is also disclosed.

17 Claims, 11 Drawing Sheets

METHOD FOR ORDERING A DISORDERED ALLOY AND METHOD FOR MAKING A PERPENDICULAR MAGNETIC RECORDING MEDIUM

CROSS-REFERENCE TO RELATED APPLICATION

This application claims priority of Taiwanese application no. 098130767, filed on Sep. 11, 2009.

BACKGROUND OF THE INVENTION

1. Field of the Invention

This invention relates to a method for ordering a disordered alloy and a method for making a perpendicular magnetic recording (PMR) medium, more particularly to a method involving simultaneously ion bombarding and annealing a disordered alloy for making a magnetic recording material of a PMR medium.

2. Description of the Related Art

As magnetic recording technology continues to advance, perpendicular magnetic recording (PMR) materials have been developed for achieving a need for a high density recording medium. It is known in the art that FePt alloy having an ordered phase (or $L1_0$ phase), i.e., a face-centered tetragonal (FCT) crystal structure, exhibits a high magnetocrystalline anisotropy energy (Ku) and thus can be used in a PMR medium to enhance the thermal stability of the PMR medium. In addition, the ordered FePt alloy has a coercive field (Hc) and a saturation magnetization (Ms) higher than the requirements of a satisfactory PMR medium, which are required to be at least 1.5 kOe and 100 emu/cm$^3$, respectively. FePt alloy films for use in the PMR medium are usually formed by deposition techniques, such as sputtering techniques. The FePt alloy films thus formed normally have a disordered phase, i.e., a FCC (Face Centered Cubic) structure. Conventionally, the disordered FePt alloy can be annealed under a temperature of above 400° C. so as to be converted from the FCC structure into the FCT structure. However, the annealing temperature is too high and can result in damage to semiconductor components which the PMR material is integrated to.

SUMMARY OF THE INVENTION

Therefore, the object of the present invention is to provide a method for ordering a disordered alloy that can overcome the aforesaid drawback of the prior art.

Another object of the present invention is to provide a method for making a perpendicular magnetic recording medium.

According to one aspect of this invention, there is provided a method for ordering a disordered alloy that comprises simultaneously ion bombarding and annealing a disordered alloy to transform the disordered alloy from a disordered crystalline state to an ordered crystalline state.

According to another aspect of this invention, there is provided a method for making a perpendicular magnetic recording medium that comprises: (a) forming a magnetic film of a disordered alloy over a substrate; and (b) simultaneously ion bombarding and annealing the magnetic film of the disordered alloy to transform the disordered alloy from a disordered crystalline state to an ordered crystalline state that is suitable as a magnetic recording material.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
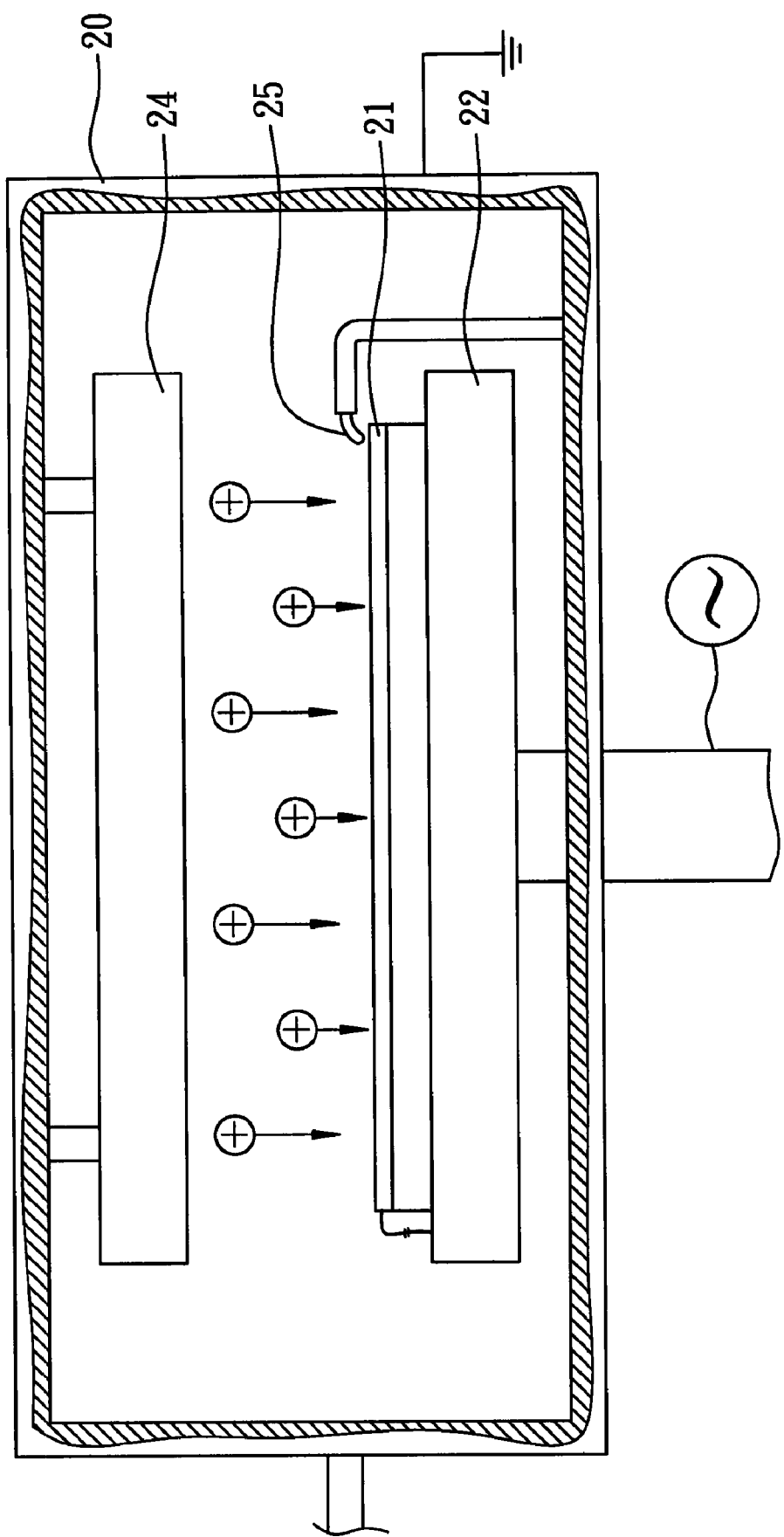
FIG. 1 is a schematic view to illustrate a state where a disordered alloy is bombarded in a reaction chamber in the preferred embodiment of a method for ordering the disordered alloy according to this invention.

Referring to FIG. 1, the preferred embodiment of a method for ordering a disordered alloy according to the present invention includes simultaneously ion bombarding and annealing a disordered alloy 21 to transform the disordered alloy 21 from a disordered crystalline state to an ordered crystalline state.

Preferably, the disordered alloy 21 is a Fe alloy. More preferably, the Fe alloy is FePt alloy. The Fe content of the FePt alloy ranges from 25 at % to 75 at %.

Figure 2:
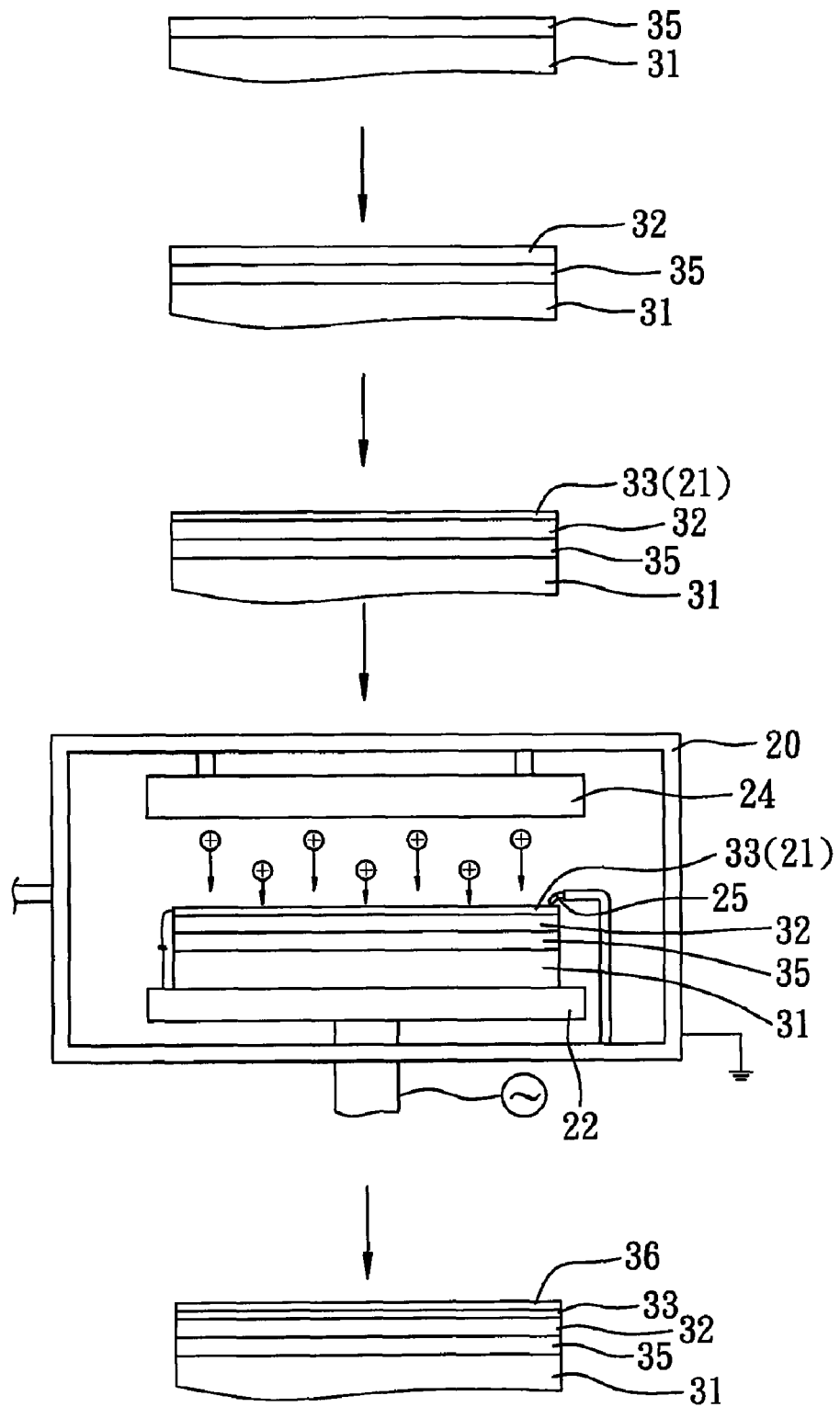
FIG. 2 illustrates consecutive steps of the preferred embodiment of a method for making a perpendicular magnetic recording medium according to this invention.

Referring to FIG. 2, the preferred embodiment of a method for making a perpendicular magnetic recording medium according to the present invention includes: forming a soft magnetic underlayer 35 on a substrate 31; forming an interlayer 32 made from Cr, MgO, or Cr alloy on the soft magnetic underlayer 35; forming a magnetic film 33 of a disordered alloy on the interlayer 32; simultaneously ion bombarding and annealing the magnetic film 33 of the disordered alloy to transform the disordered alloy from a disordered crystalline state to an ordered crystalline state that is suitable as a magnetic recording material; and forming a protective layer 36 on the ordered magnetic film 33.

Preferably, the disordered alloy is a Fe alloy. More preferably, the Fe alloy is FePt alloy.

Preferably, the ordered crystalline state in step (b) is face-centered tetragonal crystal structure.

Preferably, the ion bombarding is performed by ionizing a gas source in a reaction chamber 20 of a reactor. The gas source is selected from $H_2$, He, Ar, or combinations thereof. A radio frequency bias voltage is applied to a holder 22 supporting the magnetic film 33 of the disordered alloy to attract the positive ions to attack the magnetic film 33 of the disordered alloy. The magnetic film 33 of the disordered alloy has a layer thickness ranging from 5 nm to 300 nm. The ion bombarding and the annealing are simultaneously conducted at a temperature ranging from 100° C. to 350° C. for a period of time ranging from 5 minutes to 300 minutes. The temperature is measured using a thermocouple 25 that is disposed close to a surface of the magnetic film 33 (see FIG. 2). As shown in FIG. 2, the heat for the annealing is generated using a quartz heater 24.

During the ion bombarding, most of the incident energy (<100 eV) of the ion bombarding is shifted to the surface of the magnetic film 33 of the disordered alloy, thereby resulting in formation of a high concentration of surface vacancies at the surface of the disordered magnetic film 33, which, in turn, results in an increase in the surface mobility of adatoms of the magnetic film 33 of the disordered alloy. As a consequence, the annealing temperature for ordering the disordered alloy can be reduced by virtue of the increased surface mobility of adatoms of the disordered magnetic film 33.

It is noted that the layer thickness of the ordered magnetic film 33 can be undesirably reduced due to sputtering effect of the ion bombarding. Hence, it is important to control the ion bombarding time and the intensity of the incident energy which depends on the radio frequency bias voltage (Vb) and the type of the gas source. High incident energy of the ion bombarding can cause significant reduction of the layer thickness of the ordered magnetic film 33, which, in turn, results in a decrease in the saturation magnetization (Ms) of the ordered magnetic film 33.

When the gas source is $H_2$, the following conditions are preferable: the radio frequency bias voltage (Vb) ranges from 10 V to 600 V, the temperature ranges from 168° C. to 300° C., and the layer thickness of the disordered magnetic film 33 ranges from 30 nm to 240 nm. More preferably, the ion bombarding and the annealing are simultaneously conducted at a temperature ranging from 180° C. to 300° C. for a period of time ranging from 30 minutes to 90 minutes.

When the gas source is He, the following conditions are preferable: the radio frequency bias voltage ranges from 10 V to 200 V, the temperature ranges from 180° C. to 300° C., and the layer thickness of the disordered magnetic film 33 ranges from 30 nm to 240 nm. More preferably, the ion bombarding and the annealing are simultaneously conducted at a temperature ranging from 220° C. to 300° C. for a period of time ranging from 30 minutes to 90 minutes.

When the gas source is Ar, the following conditions are preferable: the radio frequency bias voltage ranges from 10 V to 150 V, the temperature ranges from 210° C. to 300° C., and the layer thickness of the disordered magnetic film 33 ranges from 30 nm to 240 nm. More preferably, the ion bombarding and the annealing are simultaneously conducted at a temperature ranging from 250° C. to 300° C. for a period of time ranging from 30 minutes to 90 minutes.

The following examples and comparative examples are provided to illustrate the merits of the preferred embodiments of the invention, and should not be construed as limiting the scope of the invention.

Example

Preparation of Disordered FePt Alloy Layers

A glass substrate was cut into a plurality of pieces. Each piece of the glass substrate was put into a magnetron sputtering system (not shown) having a working pressure of 10 mTorr, and was deposited with a disordered FePt alloy layer thereon under room temperature. The deposition rates for Fe and Pt were about 1 nm/min. The FePt alloy layers thus formed were divided into three different groups having layer thicknesses of 50 nm, 120 nm, and 240 nm, respectively. The composition of each disordered FePt alloy layer was measured and determined as $Fe_{48}Pt_{52}$ using energy dispersive spectrometry (EDS).

Examples 1-1~1-9

E1-1~E1-9

Nine samples of the disordered $Fe_{48}Pt_{52}$ alloy layers thus formed, each having a layer thickness of 50 nm, were treated by the following steps and conditions. Referring to FIG. 1, each sample was put on a holder 22 in a reaction chamber 20. The ion bombarding and the annealing were simultaneously performed by ionizing a gas source of $H_2$ in the reaction chamber 20 under a working pressure of 20 mTorr and by applying a radio frequency bias voltage (Vb) of 25 V, 50 V, 100 V, 150 V, 200 V, 250 V, 300 V, 400 V, and 600 V to the holder 22 for E1-1, E1-2, E1-3, E1-4, E1-5, E1-6, E1-7, E1-8, and E1-9, respectively, at a temperature of 300° C. for a time period of 60 minutes (see Table 1) so as to transform each sample from a disordered FCC structure into an ordered FCT structure ($L1_0$ phase). The coercive field (Hc) of each treated sample was measured (see Table 1).

Comparative Example 1

CE1

Referring to FIG. 1, one sample of the disordered $Fe_{48}Pt_{52}$ alloy layer thus formed, having a layer thickness of 50 nm, was treated by steps and operating conditions similar to those of Examples E1-1~E1-9, except that the radio frequency bias voltage (Vb) applied to the holder 22 was 0 V.

Examples 2-1~2-6

E2-1~E2-6

Referring to FIG. 1, six samples of the disordered $Fe_{48}Pt_{52}$ alloy layers thus formed, each having a layer thickness of 50 nm, were treated by steps and operating conditions similar to those of Examples E1-1~E1-9, except that the gas source was He, and the radio frequency bias voltages (Vb) applied to the holder 22 were 50 V, 75 V, 100 V, 130 V, 150 V, and 200 V for E2-1, E2-2, E2-3, E2-4, E2-5, and E2-6, respectively.

Comparative Example 2

CE2

Referring to FIG. 1, one sample of the disordered $Fe_{48}Pt_{52}$ alloy layer thus formed, having a layer thickness of 50 nm, was treated by steps and operating conditions similar to those of Examples E2-1~E2-6, except that the radio frequency bias voltage (Vb) applied to the holder 22 was 0 V.

Examples 3-1~3-6

E3-1~E3-6

Referring to FIG. 1, six samples of the disordered $Fe_{48}Pt_{52}$ alloy layers thus formed, each having a layer thickness of 50 nm, were treated by steps and operating conditions similar to those of Examples E1-1~E1-9, except that the gas source was Ar, and the radio frequency bias voltages (Vb) applied to the holder 22 were 10 V, 25 V, 50 V, 75 V, 100 V, and 150 V for E3-1, E3-2, E3-3, E3-4, E3-5, and E3-6, respectively.

Comparative Example 3

CE3

Referring to FIG. 1, one sample of the disordered $Fe_{48}Pt_{52}$ alloy layer thus formed, having a layer thickness of 50 nm, was treated by steps and operating conditions similar to those of Examples E3-1~E3-6, except that the radio frequency bias voltage (Vb) applied to the holder 22 was 0 V.

Comparative Example 4

CE4

One sample of the disordered $Fe_{48}Pt_{52}$ alloy layer thus formed, having a layer thickness of 50 nm, was subjected to vacuum annealing at 400° C. for 60 minutes.

Figure 3:
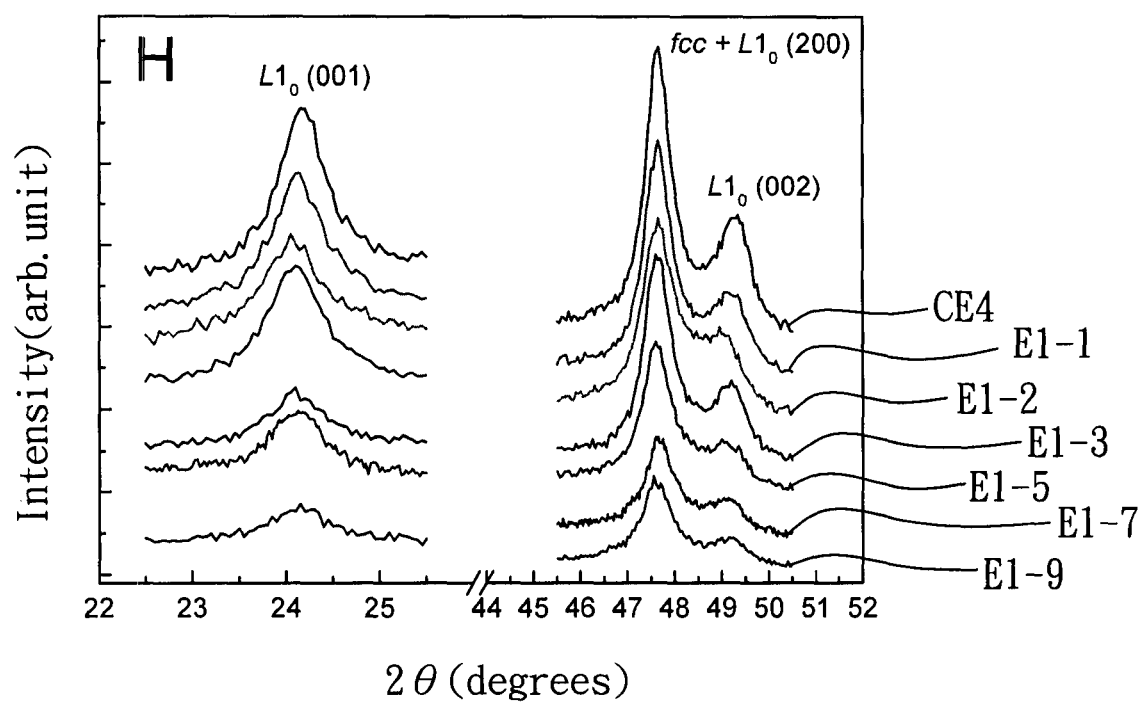
FIG. 3 is an X-Ray Diffraction (XRD) plot to illustrate the crystal structures of FePt alloy layers of Examples E1-1, E1-2, E1-3, E1-5, E1-7, and E1-9.

The XRD curves shown in FIG. 3 illustrate the crystal structures of the $Fe_{48}Pt_{52}$ alloy layers of Examples E1-1, E1-2, E1-3, E1-5, E1-7, E1-9, and Comparative Example CE4, respectively. Three diffraction peaks of (001), (200), and (002) are found respectively at 2θ of about 24, 47.5 and 49 degrees for each XRD curve shown in FIG. 3, which demonstrates that each of the $Fe_{48}Pt_{52}$ alloy layers of Examples E1-1, E1-2, E1-3, E1-5, E1-7, and E1-9 has an $L1_0$ phase. It is noted that Examples E1-4, E1-6 and E1-8 are omitted in FIG. 3 for the sake of clarity. XRD tests of Examples E1-4, E1-6 and E1-8 also demonstrate that the $Fe_{48}Pt_{52}$ alloy layers of Examples E1-4, E1-6 and E1-8 exhibit an $L1_0$ phase.

Figure 4:
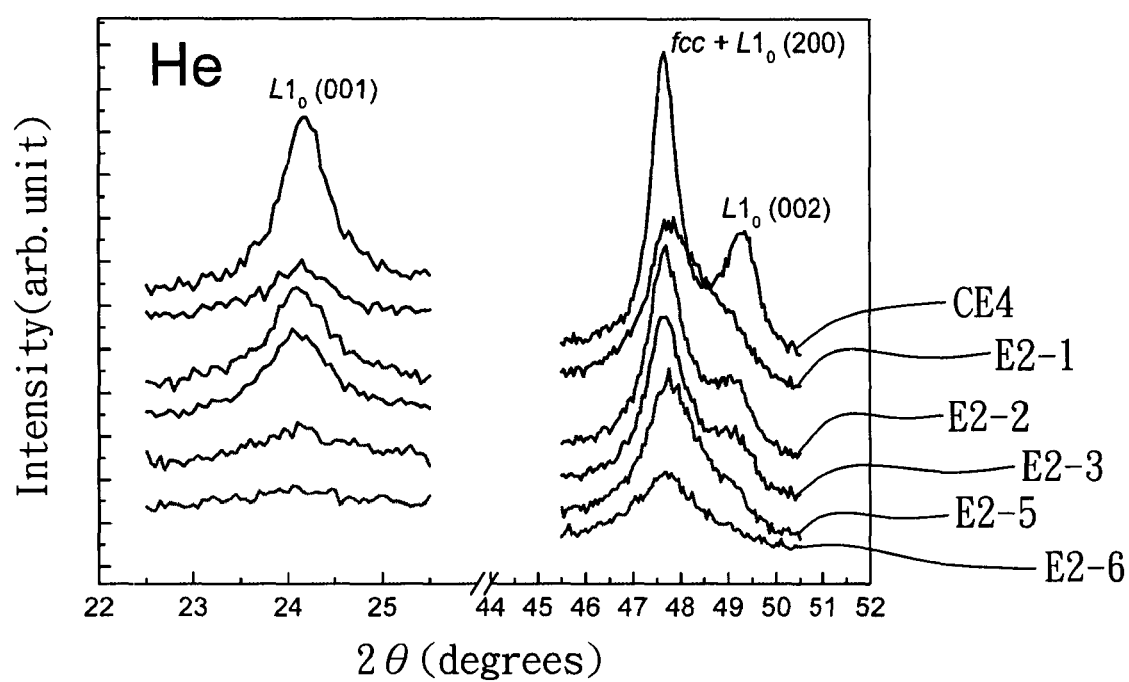
FIG. 4 is an X-Ray Diffraction (XRD) plot to illustrate the crystal structures of FePt alloy layers of Examples E2-1, E2-2, E2-3, E2-5, and E2-6.

The XRD curves shown in FIG. 4 illustrate the crystal structures of the $Fe_{48}Pt_{52}$ alloy layers of Examples E2-1, E2-2, E2-3, E2-5, E2-6 and Comparative Example CE4, respectively. Two diffraction peaks of (001) and (200) are found respectively at 2θ of about 24 and 47.5 degrees for each XRD curve shown in FIG. 4, which demonstrates that each of the $Fe_{48}Pt_{52}$ alloy layers of Examples E2-1, E2-2, E2-3, E2-5 and E2-6 has an $L1_0$ phase. It is noted that Example E2-4 is omitted in FIG. 4 for the sake of clarity. An XRD test of Example E2-4 also demonstrates that the $Fe_{48}Pt_{52}$ alloy layer of Example E2-4 exhibits an $L1_0$ phase.

Figure 5:
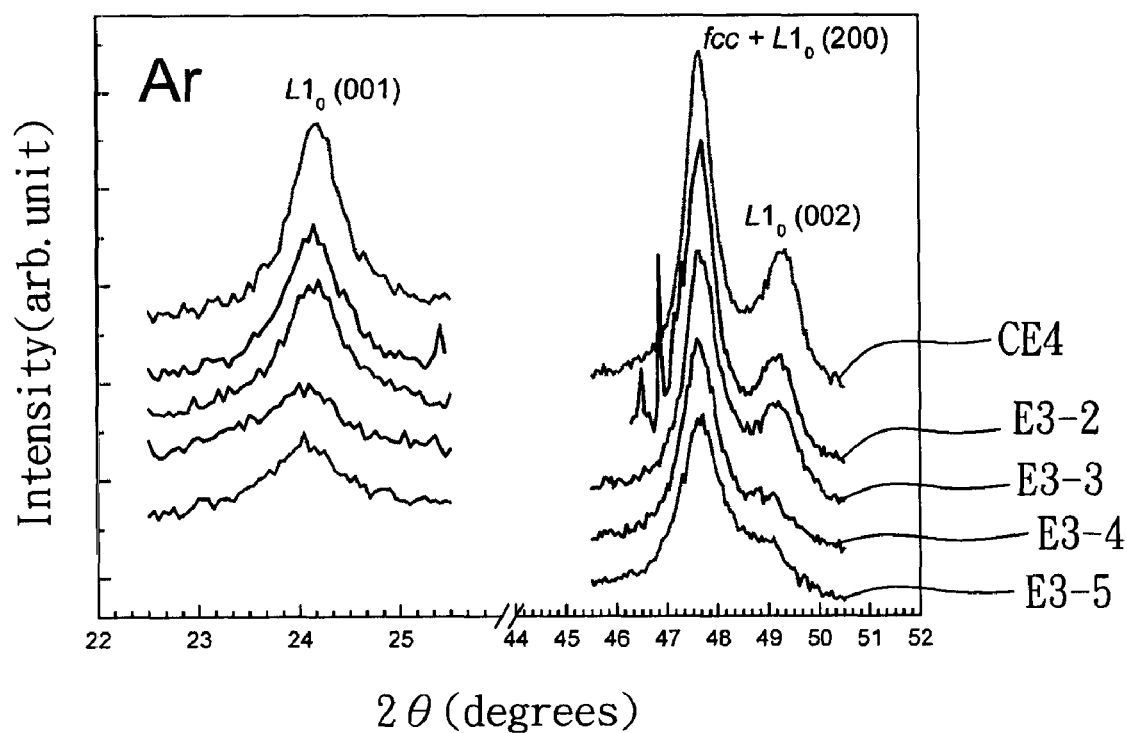
FIG. 5 is an X-Ray Diffraction (XRD) plot to illustrate the crystal structures of FePt alloy layers of Examples E3-2, E3-3, E3-4, and E3-5.

The XRD curves shown in FIG. 5 illustrate the crystal structures of the $Fe_{48}Pt_{52}$ alloy layers of Examples E3-2, E3-3, E3-4, E3-5 and Comparative Example CE4, respectively. Three diffraction peaks of (001), (200), and (002) are found respectively at 2θ of about 24, 47.5 and 49 degrees for each XRD curve shown in FIG. 5, which demonstrates that each of the $Fe_{48}Pt_{52}$ alloy layers of Examples E3-2, E3-3, E3-4 and E3-5 has an $L1_0$ phase. It is noted that Examples E3-1 and E3-6 are omitted in FIG. 5 for the sake of clarity. XRD tests of Examples E3-1 and E3-6 also demonstrate that the $Fe_{48}Pt_{52}$ alloy layers of Example E3-1 and E3-6 exhibit an $L1_0$ phase.

Figure 6A:
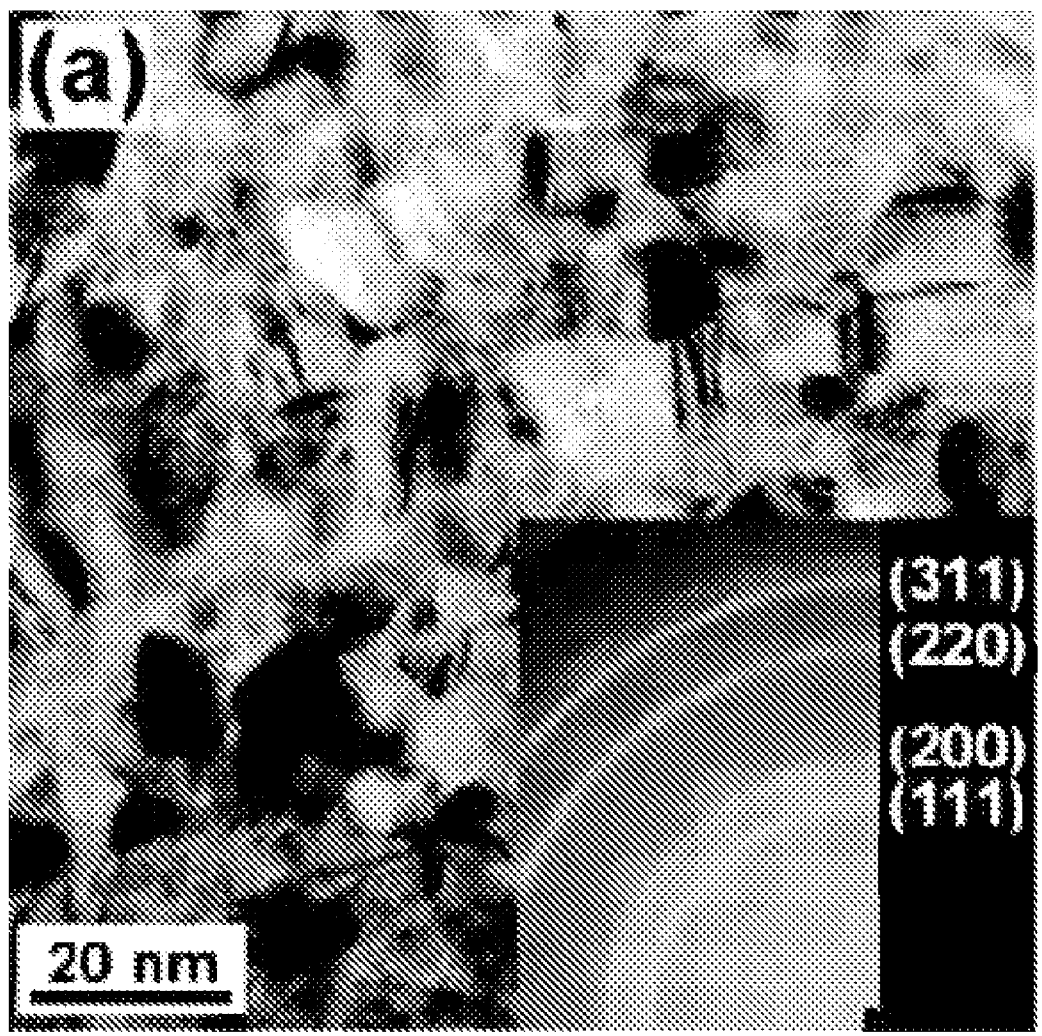
FIGS. 6a to 6d are transmission electron microscope (TEM) images, each of which has a selected area diffraction (SAD) pattern inserted therein, to illustrate the crystal structures of the FePt alloy layers of Comparative Example (CE1), Example E1-5, Example E1-9 and Example E2-6, respectively.
Figure 6B:
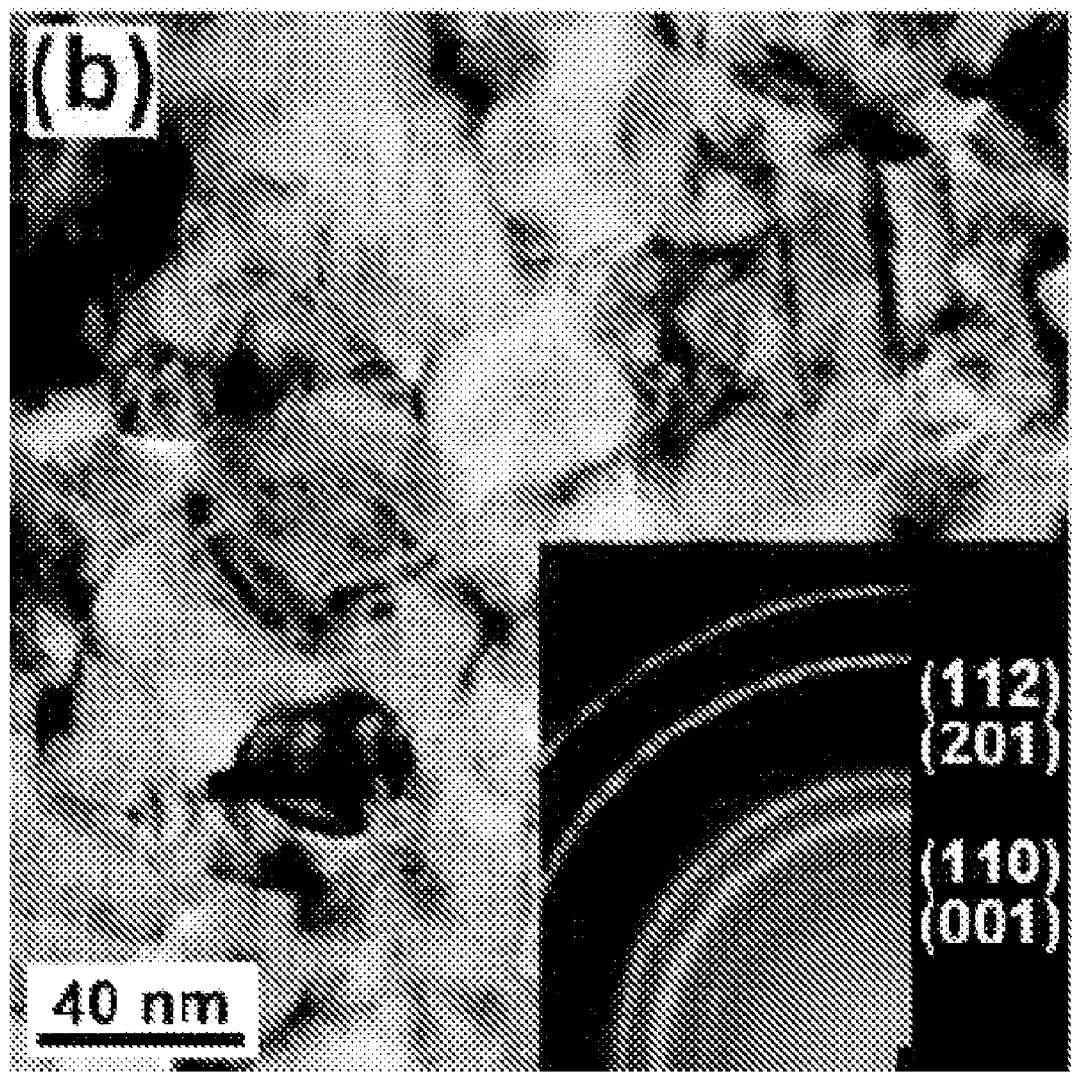
Figure 6C:
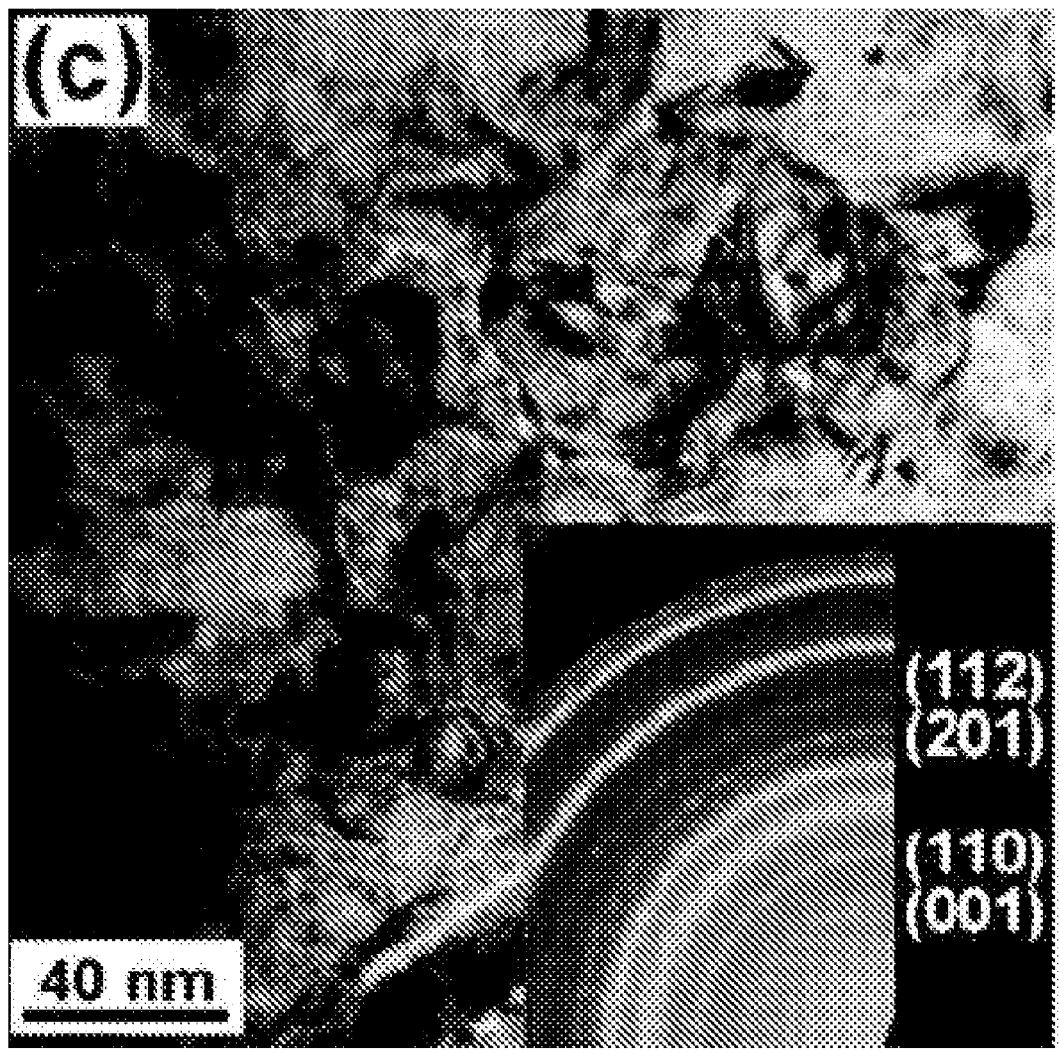
Figure 6D:
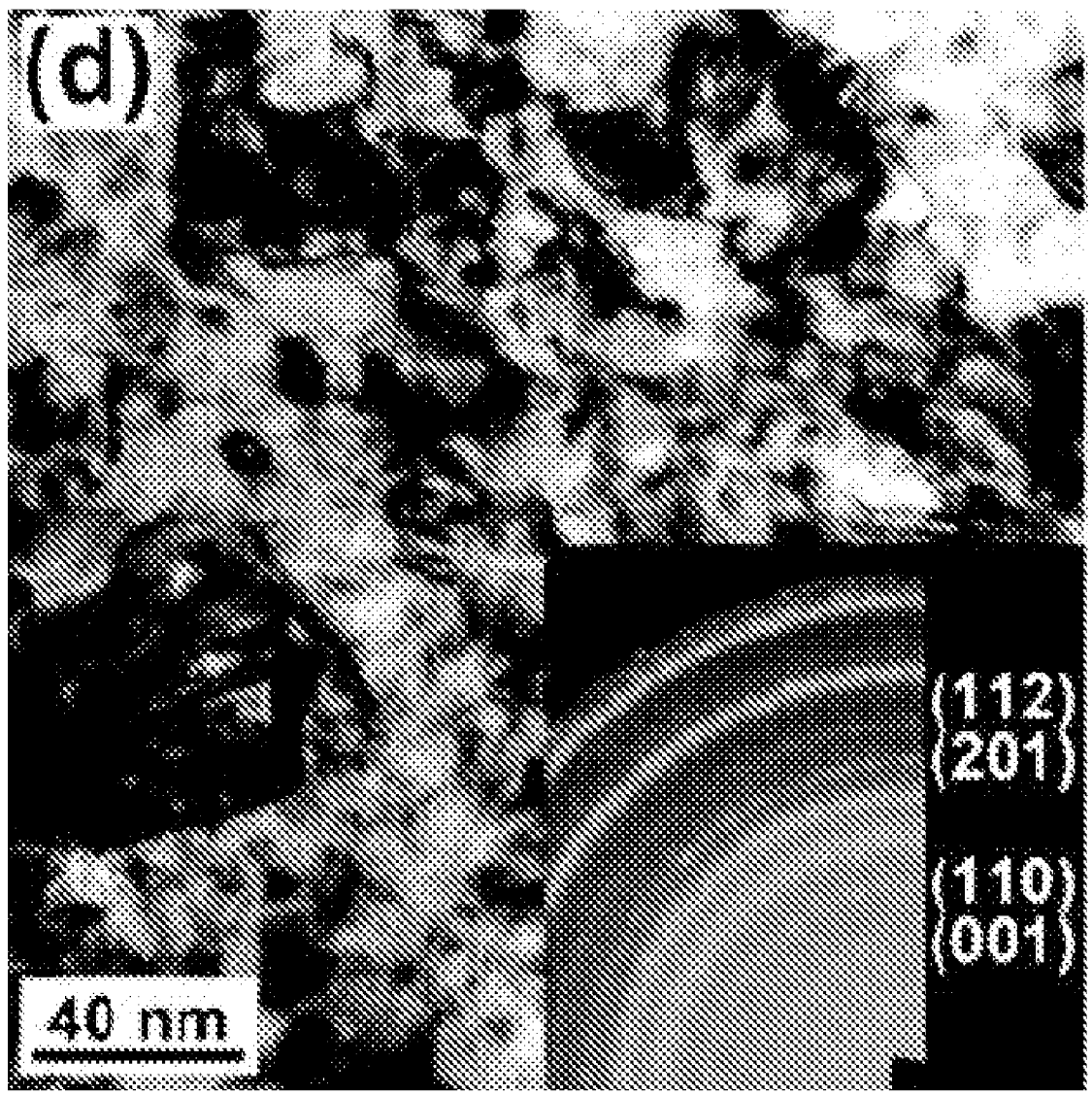

From the TEM images shown in FIGS. 6a, 6b, 6c, and 6d, each of which has a SAD pattern inserted therein, the $Fe_{48}Pt_{52}$ alloy layer of Comparative Example CE1 has a disordered phase FCC crystal structure (see FIG. 6a), the $Fe_{48}Pt_{52}$ alloy layer of Example E1-5 has an $L1_0$ phase having a grain size of about 30 nm (see FIG. 6b), the $Fe_{48}Pt_{52}$ alloy layer of Example E1-9 has an $L1_0$ phase (see FIG. 6c), and the $Fe_{48}Pt_{52}$ alloy layer of Example E2-6 has an $L1_0$ phase having a grain size ranging from 10 nm to 50 nm (see FIG. 6d).

Figure 7:
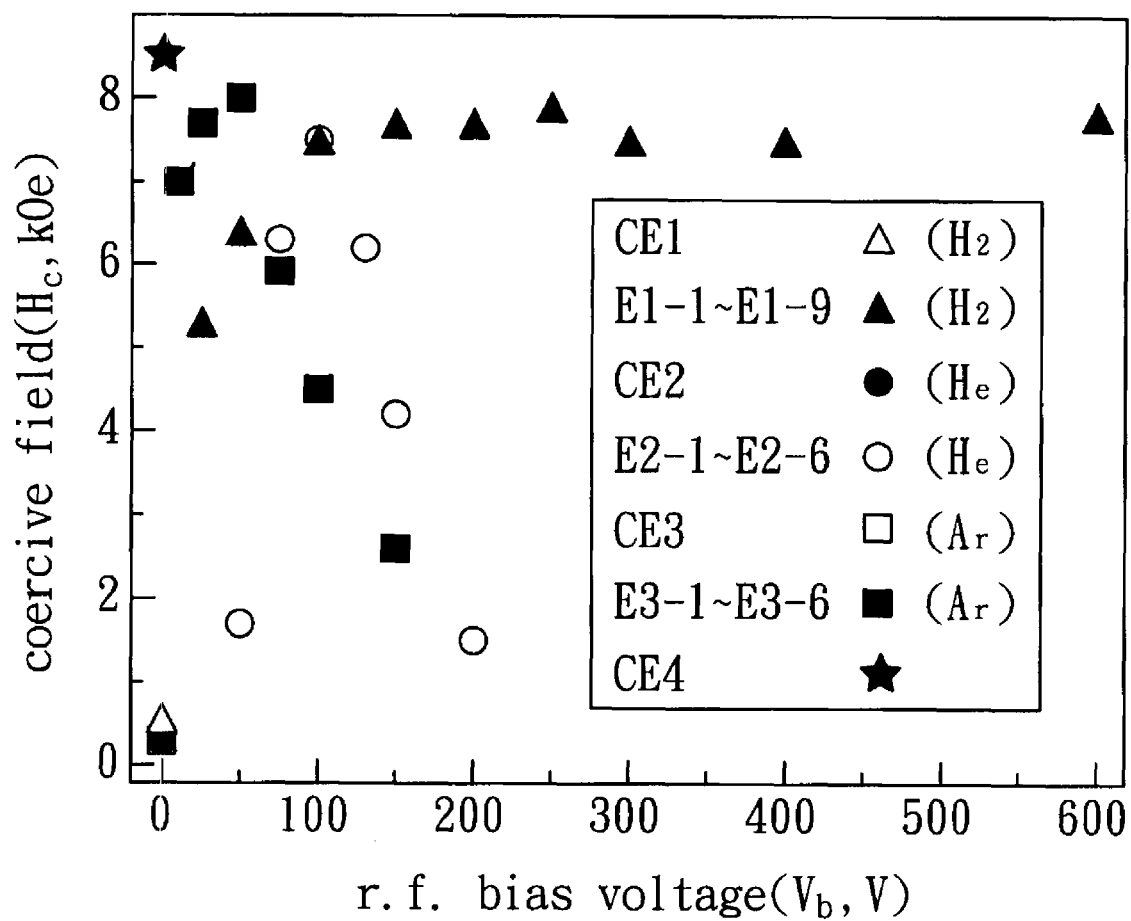
FIG. 7 is a plot of coercive field (Hc) vs. radio frequency bias voltage (Vb) to illustrate the magnetic properties of Comparative Examples 1~4 (CE1~CE4) and Examples E1-1~E1-9, E2-1~2-6, and E3-1~3-6.

FIG. 7 illustrates the relation of coercive field (Hc) vs. radio frequency bias voltage (Vb) for Examples E1-1~E1-9, E2-1~E2-6, E3-1~E3-6 and Comparative Examples CE1~CE4. The results are as follows. The coercive fields (Hc) of Comparative Examples CE1~CE3 (zero bias voltage) approach zero. The coercive field (Hc) of Comparative Example 4 (CE4) (vacuum annealing under 400° C.) is about 8.5 kOe. When the gas source is $H_2$, the coercive field (Hc) of the $Fe_{48}Pt_{52}$ alloy layer is gradually increased with an increase in the bias voltage and approaches about 7.5 kOe when the bias voltage reaches and is greater than 100 V (E1-3). When the gas source is He, the coercive field (Hc) of the $Fe_{48}Pt_{52}$ alloy layer is gradually increased to a maximum value of 7.5 kOe at a radio frequency bias voltage (Vb) of 100 V (E2-3). When the gas source is Ar, the coercive field (Hc) of the $Fe_{48}Pt_{52}$ alloy layer is gradually increased to a maximum value of 8 kOe at a radio frequency bias voltage (Vb) of 50 V (E3-3).

Figure 8:
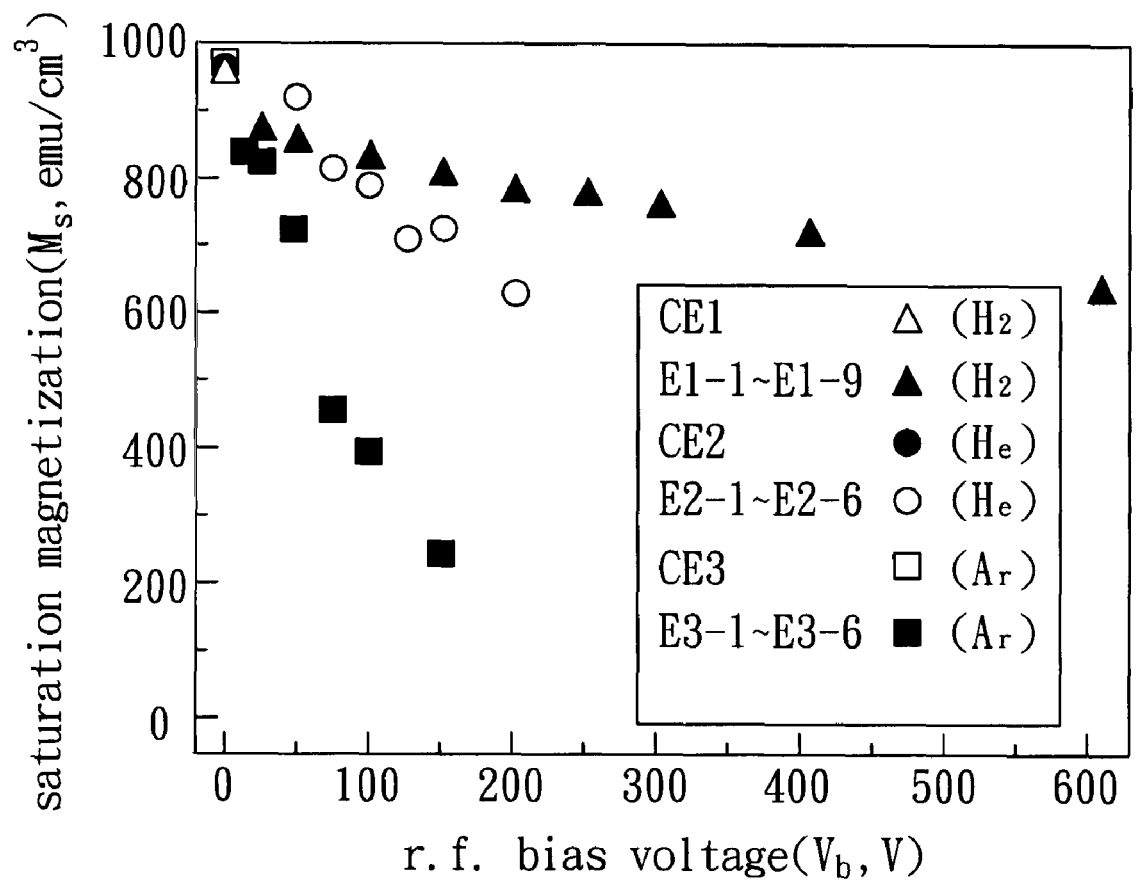
FIG. 8 is a plot of saturation magnetization (Ms) vs. radio frequency bias voltage (Vb) to illustrate the relationship between Ms and Vb of Comparative Examples 1~3 (CE1~CE3) and Examples E1-1~E1-9, E2-1~E2-6, and E3-1~E3-6.

FIG. 8 illustrates the relation of saturation magnetization (Ms) to radio frequency bias voltage (Vb) for Examples E1-1~E1-9, E2-1~E2-6, and E3-1~E3-6 and Comparative Examples CE1~CE3. The results show that the saturation magnetization (Ms) of each Example is decreased with an increase in the bias voltage due to the sputtering effect. However, the saturation magnetizations (Ms) of each Example can still meet the requirement of the perpendicular magnetic recording medium.

Example E4

Referring to FIG. 1, one sample of the disordered $Fe_{48}Pt_{52}$ alloy layer thus formed, having a layer thickness of 240 nm, was treated by steps and operating conditions similar to those of Example E1-5, except that the annealing temperature of Example E4 was 232° C. The $Fe_{48}Pt_{52}$ alloy layer thus treated contains an $L1_0$ phase and has a coercive field (Hc) of about 4.0 kOe.

Example E5

Referring to FIG. 1, one sample of the disordered $Fe_{48}Pt_{52}$ alloy layer thus formed, having a layer thickness of 240 nm, was treated by steps and operating conditions similar to those of Example E4, except that the radio frequency bias voltage (Vb) of Example E5 was 600 V. The $Fe_{48}Pt_{52}$ alloy layer thus treated contains an $L1_0$ phase and has a coercive field (Hc) of about 6.0 kOe.

Example E6

Referring to FIG. 1, one sample of the disordered $Fe_{48}Pt_{52}$ alloy layer thus formed, having a layer thickness of 240 nm, was treated by steps and operating conditions similar to those of Example E5, except that the annealing temperature of Example E6 was 210° C. The $Fe_{48}Pt_{52}$ alloy layer thus treated contains an $L1_0$ phase and has a coercive field (Hc) of about 2.0 kOe. It is noted that the coercive field (Hc) can be increased by extending the annealing time.

Example E7

Referring to FIG. 1, one sample of the disordered $Fe_{48}Pt_{52}$ alloy layer, having a layer thickness of 120 nm, was treated by steps and operating conditions similar to those of Example E2-3, except that the annealing temperature was 232° C. The $Fe_{48}Pt_{52}$ alloy layer thus treated contains an $L1_0$ phase and has a coercive field (Hc) of about 4.5 kOe.

Example 8

E8

Referring to FIG. 1, one sample of the disordered $Fe_{48}Pt_{52}$ alloy layer thus formed, having a layer thickness of 240 nm, was treated by steps and operating conditions the same as those of Example E7. The results show that, compared with Example 7, the coercive field (Hc) of the $Fe_{48}Pt_{52}$ alloy layer thus treated can be increased to 6.5 kOe by increasing the layer thickness of the disordered $Fe_{48}Pt_{52}$ alloy layer.

TABLE 1

|  | Ion bombarding# | | Annealing | | Thickness | Hc |
|---|---|---|---|---|---|---|
|  | Ion | Vb (V) | Temp. (° C.) | Time (min) | (nm) | (kOe) |
| CE1 | H | 0 | 300 | 60 | 50 | 0.5 |
| E1-1 | H | 25 | 300 | 60 | 50 | 5.3 |
| E1-2 |  | 50 | 300 | 60 | 50 | 6.4 |
| E1-3 |  | 100 | 300 | 60 | 50 | 7.5 |
| E1-4 |  | 150 | 300 | 60 | 50 | 7.7 |
| E1-5 |  | 200 | 300 | 60 | 50 | 7.7 |
| E1-6 |  | 250 | 300 | 60 | 50 | 7.9 |
| E1-7 |  | 300 | 300 | 60 | 50 | 7.5 |
| E1-8 |  | 400 | 300 | 60 | 50 | 7.5 |
| E1-9 |  | 600 | 300 | 60 | 50 | 7.8 |
| CE2 | He | 0 | 300 | 60 | 50 | 0.3 |
| E2-1 | He | 50 | 300 | 60 | 50 | 1.7 |
| E2-2 |  | 75 | 300 | 60 | 50 | 6.3 |
| E2-3 |  | 100 | 300 | 60 | 50 | 7.5 |
| E2-4 |  | 130 | 300 | 60 | 50 | 6.2 |
| E2-5 |  | 150 | 300 | 60 | 50 | 4.2 |
| E2-6 |  | 200 | 300 | 60 | 50 | 1.5 |
| CE3 | Ar | 0 | 300 | 60 | 50 | 0.3 |
| E3-1 | Ar | 10 | 300 | 60 | 50 | 7.0 |
| E3-2 |  | 25 | 300 | 60 | 50 | 7.7 |
| E3-3 |  | 50 | 300 | 60 | 50 | 8.0 |
| E3-4 |  | 75 | 300 | 60 | 50 | 5.9 |
| E3-5 |  | 100 | 300 | 60 | 50 | 4.5 |
| E3-6 |  | 150 | 300 | 60 | 50 | 2.6 |
| CE4 | — | 0 | 400 | 60 | 50 | 8.5 |
| E4 | H | 200 | 232 | 60 | 240 | 4.0 |
| E5 | H | 600 | 232 | 60 | 240 | 6.0 |
| E6 | H | 600 | 210 | 60 | 240 | 2.0 |
| E7 | He | 100 | 232 | 60 | 120 | 4.5 |
| E8 | He | 100 | 232 | 60 | 240 | 6.5 | the period of time for the ion bombarding is 60 minutes.

In conclusion, by simultaneously ion bombarding and annealing the magnetic film of the disordered alloy in the method of this invention for making the perpendicular magnetic recording medium, the annealing temperature for ordering the disordered alloy can be decreased. The alloy layer thus treated exhibits an $L1_0$ phase and has desired coercive field and saturation magnetization.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for ordering a disordered alloy, said method comprising: simultaneously ion bombarding and annealing a disordered FePt alloy to transform the disordered FePt alloy from a disordered crystalline state to an ordered crystalline state, wherein incident energy of the ion bombarding is controlled such that the ordered FePt alloy has a coercive field between 1.5 kOe and 8.0 kOe inclusive, and wherein controlling the incident energy comprises applying a radio-frequency bias voltage having a voltage amplitude between 10 volts and 600 volts.

2. The method of claim 1, wherein the ion bombarding is performed by ionizing a gas source selected from $H_2$, He, Ar, or combinations thereof, and applying a radio frequency bias voltage to a holder supporting the disordered alloy, the ion bombarding and the annealing being conducted at a temperature ranging from 100° C. to 350° C.

3. The method of claim 2, wherein the ion bombarding and the annealing are simultaneously conducted for a period of time ranging from 5 minutes to 300 minutes.

4. The method of claim 2, wherein the gas source is $H_2$, the radio frequency bias voltage used for ion bombardment ranges from 10 V to 600 V, and the temperature ranges from 168° C. to 300° C.

5. The method of claim 2, wherein the gas source is He, the radio frequency bias voltage used for ion bombardment ranges from 10 V to 200 V, and the temperature ranges from 180° C. to 300° C.

6. The method of claim 2, wherein the gas source is Ar, the radio frequency bias voltage used for ion bombardment ranges from 10 V to 150 V, and the temperature ranges from 210° C. to 300° C.

7. A method for making a perpendicular magnetic recording medium, comprising: (a) forming a magnetic film of a disordered FePt alloy over a substrate; and (b) simultaneously ion bombarding and annealing the disordered FePt alloy to transform the disordered FePt alloy from a disordered crystalline state to an ordered crystalline state that is suitable as a magnetic recording material, the ordered crystalline state being a state in which the alloy has a face-centered tetragonal crystal structure, wherein the incident energy of the ion bombarding is controlled such that the ordered FePt alloy has a coercive field between 1.5 kOe and 8.0 kOe inclusive, and wherein controlling the incident energy comprises applying a radio-frequency bias voltage having a voltage amplitude between 10 volts and 600 volts.

8. The method of claim 7, wherein the ion bombarding is performed by ionizing a gas source selected from $H_2$, He, Ar, or combinations thereof, and applying a radio frequency bias voltage to a holder supporting the disordered FePt alloy, the magnetic film of the disordered FePt alloy having a layer thickness ranging from 5 nm to 300 nm, the ion bombarding and the annealing being conducted at a temperature ranging from 100° C. to 350° C.

9. The method of claim 8, wherein the ion bombarding and the annealing are simultaneously conducted for a period of time ranging from 5 minutes to 300 minutes.

10. The method of claim 8, wherein the gas source is $H_2$, the radio frequency bias voltage used for ion bombardment ranges from 10 V to 600 V, and the temperature ranges from 168° C. to 300° C.

11. The method of claim 8, wherein the gas source is He, the radio frequency bias voltage used for ion bombardment ranges from 10 V to 200 V, and the temperature ranges from 180° C. to 300° C.

12. The method of claim 8, wherein the gas source is Ar, the radio frequency bias voltage used for ion bombardment ranges from 10 V to 150 V, and the temperature ranges from 210° C. to 300° C.

13. The method of claim 7, further comprising, before step (a), forming a soft magnetic underlayer on the substrate and forming an interlayer on the magnetic underlayer, the disordered magnetic film in step (a) being formed on the interlayer.

14. The method of claim 13, wherein the interlayer formed on the magnetic underlayer is made from Cr, MgO, or Cr alloy.

15. The method of claim 7, further comprising forming a protective layer on the ordered magnetic film after step (b).

16. The method of claim 1, wherein the incident energy of the ion bombarding is between 10 eV and 600 eV.

17. The method of claim 7, wherein the incident energy of the ion bombarding is between 10 eV and 600 eV.

* * * * *